(12) United States Patent
Fleeman et al.

(10) Patent No.: US 8,675,543 B2
(45) Date of Patent: Mar. 18, 2014

(54) ROUTE LIMITING IN BORDER GATEWAY PROTOCOL OVER SATELLITE NETWORKS

(75) Inventors: Danny M. Fleeman, McKinney, TX (US); Matthew R. Donley, Fort Worth, TX (US); Richard D. Hieb, Lake Dallas, TX (US); Joseph F. Thomasson, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 289 days.

(21) Appl. No.: 13/038,659

(22) Filed: Mar. 2, 2011

(65) Prior Publication Data

US 2012/0218936 A1 Aug. 30, 2012

Related U.S. Application Data

(60) Provisional application No. 61/446,293, filed on Feb. 24, 2011.

(51) Int. Cl.
H04L 12/26 (2006.01)
H04B 7/185 (2006.01)
H04L 12/56 (2011.01)
H04W 4/00 (2009.01)

(52) U.S. Cl.
USPC ............ 370/316; 370/213; 370/400; 455/427

(58) Field of Classification Search
None
See application file for complete search history.

(56) References Cited

U.S. PATENT DOCUMENTS

| 6,829,221 | B1 * | 12/2004 | Winckles et al. | 370/238 |
| 2002/0163884 | A1 * | 11/2002 | Peles et al. | 370/229 |
| 2006/0221971 | A1 * | 10/2006 | Andrieux et al. | 370/392 |
| 2007/0008982 | A1 * | 1/2007 | Voit et al. | 370/401 |
| 2009/0238076 | A1 * | 9/2009 | Retana et al. | 370/238 |
| 2010/0265876 | A1 * | 10/2010 | Foxworthy et al. | 370/316 |
| 2011/0032865 | A1 * | 2/2011 | Richardson | 370/316 |

OTHER PUBLICATIONS

E. Rosen et al., RFC-2547: BGP/MPLS VPNs, The Internet Society, Mar. 1999.*
Y. Rekhter et al., RFC-1771: A Border Gateway Protocol 4 (BGP-4), The Network Working Group, Mar. 1995.*
Pepelnjak, Ivan, BGP Essentials: AS-PATH prepending, ipSpace.net, Feb. 7, 2008, http://blog.ipspace.net/2008/02/bgp-essentials-as-path-prepending.html.*
Gaddis, Jeremy, Using AS path prepending to influence inbound routing, evil routers, Mar. 7, 2009, http://evilrouters.net/2009/03/07/using-as-path-prepending-to-influence-inbound-routing/.*

* cited by examiner

*Primary Examiner* — Faruk Hamza
*Assistant Examiner* — Cassandra Decker

(57) ABSTRACT

Routes stored by routers in a network that uses the border gateway protocol may be limited to a default route. A device may set, a first route in a routing table, advertised using BGP by a first predetermined network, to be a default route for the device. The device may block forwarding of second routes, advertised using BGP, when the second routes do not correspond to the default route.

19 Claims, 6 Drawing Sheets

ROUTE LIMITING IN BORDER GATEWAY PROTOCOL OVER SATELLITE NETWORKS

RELATED APPLICATION

This application claims priority under 35 U.S.C. §119 based on U.S. Provisional Patent Application No. 61/446,293, filed Feb. 24, 2011, the disclosure of which is incorporated by reference herein in its entirety.

BACKGROUND INFORMATION

The Border Gateway Protocol (BGP) is a common networking protocol that is used to back the core routing decisions in many networks, such as the Internet. Through BGP, routers may track network reachability among autonomous systems (AS), such as the separate networks or sub-networks that make up a larger network. BGP is a path vector protocol that does not use traditional Interior Gateway Protocol (IGP) metrics, but makes routing decisions based on path, network policies and/or rulesets. For this reason, BGP effectively acts more as a reachability protocol rather than a routing protocol.

Under BGP, network devices, such as routers, maintain a routing table that keeps track of paths (also called routes) between autonomous systems. For some networks, the routing table can be relatively large, which can be problematic if the physical resources, such as the available memory, of the network device are not able to store the entire routing table.

DETAILED DESCRIPTION OF PREFERRED EMBODIMENTS

The following detailed description refers to the accompanying drawings. The same reference numbers in different drawings identify the same or similar elements.

Systems and methods described herein relate to limiting of the routes stored by routers in a private network that uses BGP. The private network may include a network that uses satellite links and a satellite hub for interfacing the satellite links to a terrestrial network. Routers in the satellite hub may limit the routes learned from the terrestrial network to a default route that refers to a designated network or router. All inbound traffic (from satellite networks to the terrestrial network) may be routed to this default route. Other mechanisms, such as using filters to limit reflected routes, may also be used to limit the number of routes learned by the satellite hub.

Figure 1:
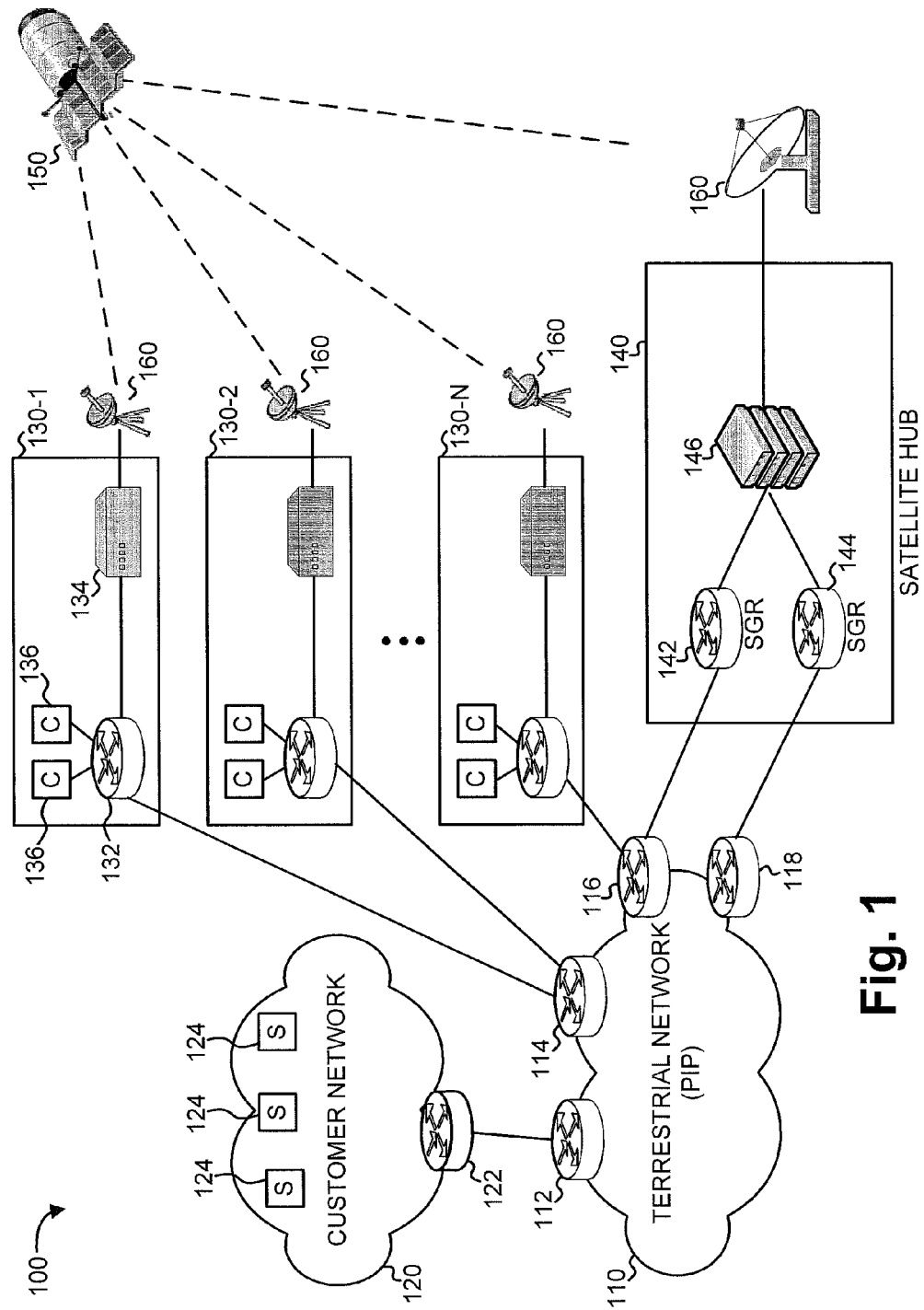
FIG. 1 is a diagram illustrating an example of a telecommunication system in which systems/methods described herein may be implemented.

FIG. 1 is a diagram illustrating an example of a telecommunication system 100 in which systems/methods described herein may be implemented. Telecommunication system 100 may generally include a number of networks (autonomous systems) that route data to one another over network links, including satellite links, using the BGP protocol. The illustrated portions of telecommunication system 100 may be used to provide network connectivity, by a telecommunications provider, to a customer or other entity at a number of customer premise locations.

As shown in FIG. 1, telecommunication system 100 may include a terrestrial network 110, customer network 120, customer premises 130-1 through 130-N, and satellite hub 140. A satellite network 150 and terrestrial satellite receivers/transmitters 160, may connect customer premises 130 and satellite hub 140.

Terrestrial network 110 may include any type of network or combination of networks, such as a local area network (LAN), a wide area network (WAN), a telephone network (e.g., the Public Switched Telephone Network (PSTN) or a cellular network), an intranet, the Internet, or a combination of networks. In one implementation, network 110 may be owned and/or managed by a telecommunications company that provides network connectivity to one or more customers. Multiprotocol Label Switching (MPLS), or other virtual network technologies, may be used to provide, on a per-customer basis, guaranteed bandwidth or switching routes through network 110. From the customer's point of view, network 110 may thus appear as a private IP (PIP) network.

Network 110 may be physically implemented by network devices, such as routers and switches, that are connected by physical transport links, such as optical links, twisted pair Ethernet links, wireless links, etc. A number of example routers, such as routers 112, 114, 116, and 118 are illustrated in network 110. Routers 112 through 118 may include edge routers (also called provider edge routers) to provide the routing interface between terrestrial network 110 and other autonomous systems, such as customer network 120, customer premises 130, and/or satellite hub 140. Routers 112 through 118 may use BGP to build routing tables and to communicate with the other autonomous systems.

Customer network 120 may include any type of network or combination of networks, such as a local area network (LAN), a wide area network (WAN), an intranet, or a combination of networks. Customer network 120 may include, for example, a proprietary corporate network that is implemented by a corporation to provide network connectivity to support the business of the corporation.

Customer network 120 may be physically implemented by network devices, such as routers and switches, that are connected by physical transport links, such as optical links, twisted pair Ethernet links, wireless links, etc. Customer network 120 may include a customer edge router 122 (also called a subscriber edge router) that connects customer network 120 to terrestrial network 110. Customer edge router 122 may use BGP to build routing tables and to communicate with other autonomous systems, such as terrestrial network 110. Customer network 120 may also include server devices, such as server devices (S) 124. Server devices 124 may include, for example, data center servers, business application servers, or other servers that store data or implement business processes that may be used by the company that operates customer network 120.

Customer premises 130-1 through 130-N (referred to collectively as customer premises 130 or singularly as customer premise 130 herein) may include facilities associated with the company or entity that controls customer network 120. For example, each customer premise 130 may include a branch office or retail location of a company that wishes to connect, via a private network, all of its branch offices/retail locations. Employees and/or computing devices at customer premises 130 may connect, over terrestrial network 110, to server devices 124 of customer network 120. Computing devices (C) 136, which may include personal computers, point-of-sale devices, etc., are shown in customer premises 130 as examples of equipment that may connect to servers 124 of customer network 120.

Each customer premise 130 may include a customer edge router 132 and a satellite modem 134. Each customer edge router 132 may connect customer premises 130 to terrestrial network 110 (and hence to customer network 120). Customer edge router 132 may use BGP to build routing tables and to communicate with other autonomous systems, such as terrestrial network 110 or satellite network 150. Satellite modem 134 may provide an interface for connecting to satellite network 150 by converting signals from the transmission medium used within customer premises 130 to the radio signals needed to communicate over satellite network 150. Satellite modem 134 may perform other network related functions, such as routing and/or switching functions. Satellite modem 134 may act as a BGP peer to customer edge router 132 and accept routes learned from it. Satellite modem 134 may filter the routes from customer edge router 132 to accept only routes initiated from the customer premise 130 of which satellite modem 134 is part of Satellite modem 134 may also pass to customer edge router 132, routes learned from the satellite network 150 with an AS pre-pend of significant length to present satellite network 150 as a less desirable path than terrestrial network 110.

Each customer premise 130 may use the terrestrial connection, from customer edge router 132 to terrestrial network 110, as the primary route through which customer premise 130 connects to customer network 120. Satellite network 150, accessed through satellite modem 134, may operate as a backup connectivity source. For example, computing devices 136 may use customer edge router 132 when connecting to customer network 120. Customer edge router 132 may attempt to route the traffic from these devices over a primary link that connects directly to terrestrial network 110. If the primary link is unavailable (e.g., the local "last mile" connection to customer premise 130 is down), customer edge router 132 may route the traffic to satellite modem 134, for transmission over satellite network 150, to satellite hub 140 and to customer network 120 (via terrestrial network 110).

Satellite hub 140 may act as a hub for connecting terrestrial network 110 to satellite network 150. In one implementation, satellite hub 140 may be controlled by the same entity, such as a telecommunications company, that maintains terrestrial network 110. Satellite hub 140 may receive and forward traffic from customer premises 130 to terrestrial network 110. Satellite hub 140 may include one or more routers, such as satellite gateway routers (SGR) 142 and 144, and one or more satellite hub servers 146.

Satellite gateway routers 142 and 144 may each connect satellite hub 140 to terrestrial network 110. Satellite gateway routers 142 and 144 may be edge routers that use BGP to build routing tables and to communicate with terrestrial network 110 and to satellite network 150. The satellite gateway routers 142 and 144 may accept routes from terrestrial network 110 via BGP and pass a limited subset of routes (i.e. default route) to satellite network 150 through satellite hub servers 146. The satellite hub servers 146 may prefer the route path via satellite gateway routers 142 and 144 to that of satellite network 150. The satellite hub servers 146 may only make routing decisions on routes leaned from satellite gateway routers 142 and 144, routes learned from satellite network 150 may be passed to satellite gateway routers 142 and 144 regardless of routing tables contained in satellite hub servers 146. In one implementation, one of satellite gateway routers 142 and 144 may be a primary connection to terrestrial network 110 and the other may be a backup connection to terrestrial network 110. For example, satellite gateway router 142, which is shown as connected to edge router 116, may provide the primary connection to terrestrial network 110. Satellite gateway router 144, which is shown as connected to edge router 118, may provide the backup connection to terrestrial network 110.

Satellite hub servers 146 may include one or more network or server devices to interface with satellite network 150. For example, satellite hub servers 146 may include satellite routers, network management devices, network accelerators/optimizers, or other devices. In one implementation, satellite hub servers 146 may include a number of devices that provide routing services for satellite network 150. In one implementation, satellite hub servers 146 may include satellite platform servers manufactured by iDirect Corporation, a subdivision of VT systems.

Satellite network 150 may include one or more satellites through which traffic, from satellite receivers/transmitters 160, can be received and transmitted. Satellite receivers/transmitters 160 may include antennas, such as parabolic antennas, designed to communicate with satellites in satellite network 150. Pairs of satellite receivers/transmitters 160 may relay traffic through a satellite in satellite network 150 to create communication links.

Although FIG. 1 shows example components of telecommunication system 100, in other implementations, telecommunication system 100 may include fewer components, different components, differently arranged components, or additional components than depicted in FIG. 1. Additionally or alternatively, one or more components of telecommunication system 100 may perform the tasks described as being performed by one or more other components of telecommunication system 100.

Figure 2:
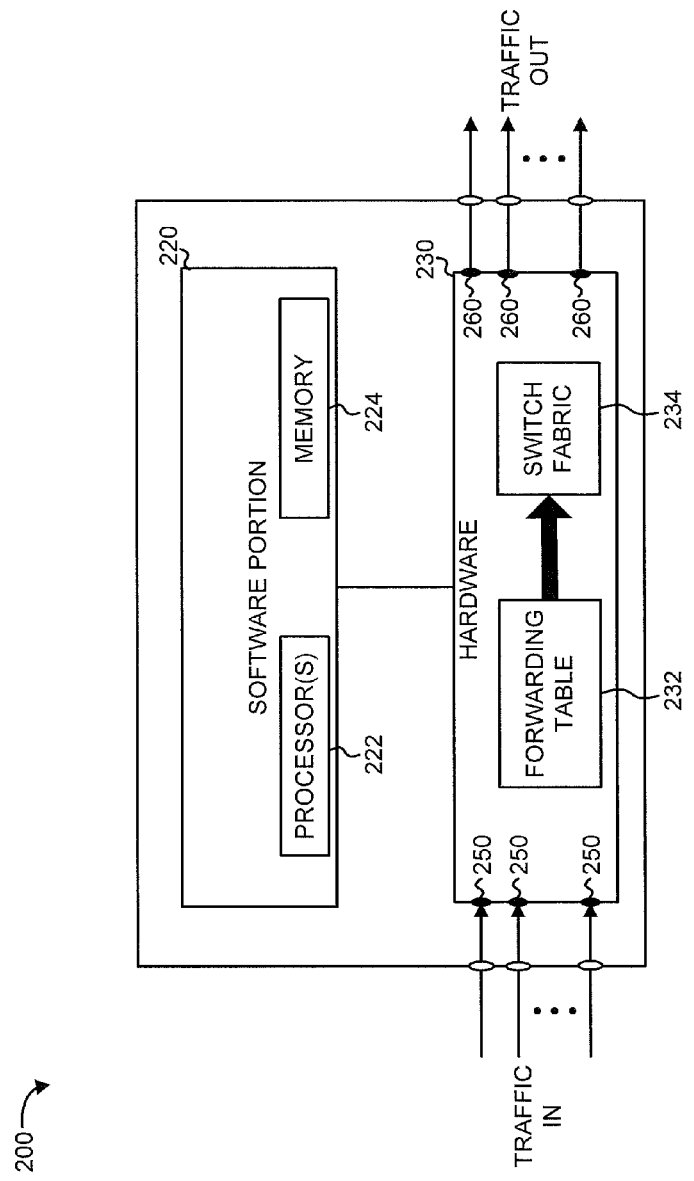
FIG. 2 is a diagram illustrating example components of a device shown in FIG. 1.

FIG. 2 is a diagram illustrating example components of a device 200, which may correspond to edge routers 112 through 118, edge router 122, customer edge router 132, satellite modem 134, satellite gateway routers 142/144, and/or one of satellite hub servers 146.

As shown in FIG. 2, device 200 may include a software portion 220 and a hardware portion 230. Software portion 220 may include software designed to control device 200. Software portion 220 may, for example, implement an operating system for device 200 and may execute processes designed to implement the network protocols used by device 200. Software portion 220 may control hardware portion 230 and provide an interface for user configuration of device 200. In general, software portion 220 may implement the functions of the device 200 that are either related to control or that can be implemented in the "slow path" through device 200. For example, software portion 220 may implement routing protocols, such as BGP.

Software portion 220, although shown as a single abstract block 220 in FIG. 2, may be implemented through, for example, one or more general purpose processor(s) 222 and one or more computer memories 224. Processor(s) 222 may include processors, microprocessors, or other types of processing logic that may interpret and execute instructions. Computer memories 224 (also referred to as computer-readable media herein) may include random access memory (RAM), read-only memory (ROM), or another type of storage device that may store information and instructions for execution by processor(s) 222.

As described herein, device 200 may perform certain operations in response to processor(s) 222 executing software instructions contained in a computer-readable medium, such as memory 224. A computer-readable medium may be defined as a non-transitory memory device. A memory device may include memory space within a single physical memory device or spread across multiple physical memory devices. The software instructions may be read into memory 224 from another computer-readable medium or from another device. The software instructions contained in memory 224 may cause processor(s) 222 to perform processes described herein. Alternatively, hardwired circuitry may be used in place of or in combination with software instructions to implement processes described herein. Thus, implementations described herein are not limited to any specific combination of hardware circuitry and software.

Hardware portion 230 may include circuitry for efficiently processing traffic (such as packetized traffic) received by network device 200. Hardware portion 230 may include, for example, logic, such as an application specific integrated circuit (ASIC), a field programmable gate array (FPGA), and/or a ternary content-addressable memory (TCAM). Hardware portion 230 may, for example, receive incoming packets, extract header information for the packets, and process the packets based on the extracted header information.

Hardware portion 230 may particularly include a forwarding table 232 and a switch fabric 234. Forwarding table 232 may be determined based on routing tables maintained by software portion 220. Forwarding table 232 may be used to lookup the appropriate output port for incoming packets. Forwarding table 232 may be updated based on the network protocols implemented by software portion 220. Based on the result of the lookup in forwarding table 232, packets may be switched to appropriate output ports through switch fabric 234.

Device 200 may also include ports for receiving and transmitting packets. A number of input ports 250 and output ports 260 are particularly shown for device 200. Packets received at one of input ports 250 may, based on the application of forwarding table 232 and switch fabric 234, be output at an appropriate one or more of output ports 260.

It can be appreciated that although device 200 is shown as including a software portion 220 and a hardware portion 230, device 200 may, in some implementations, be implemented entirely through hardware. In some implementations, device 200 may include fewer, different, differently arranged, or additional components than depicted in FIG. 2. Alternatively, or additionally, one or more components of device 200 may perform one or more tasks described as being performed by one or more other components of device 200.

As previously mentioned, device 200 may maintain a routing table, such as a routing table constructed using BGP. The routing tables may, for example, be maintained by software portion 220 and used to create forwarding table 232.

Figure 3:
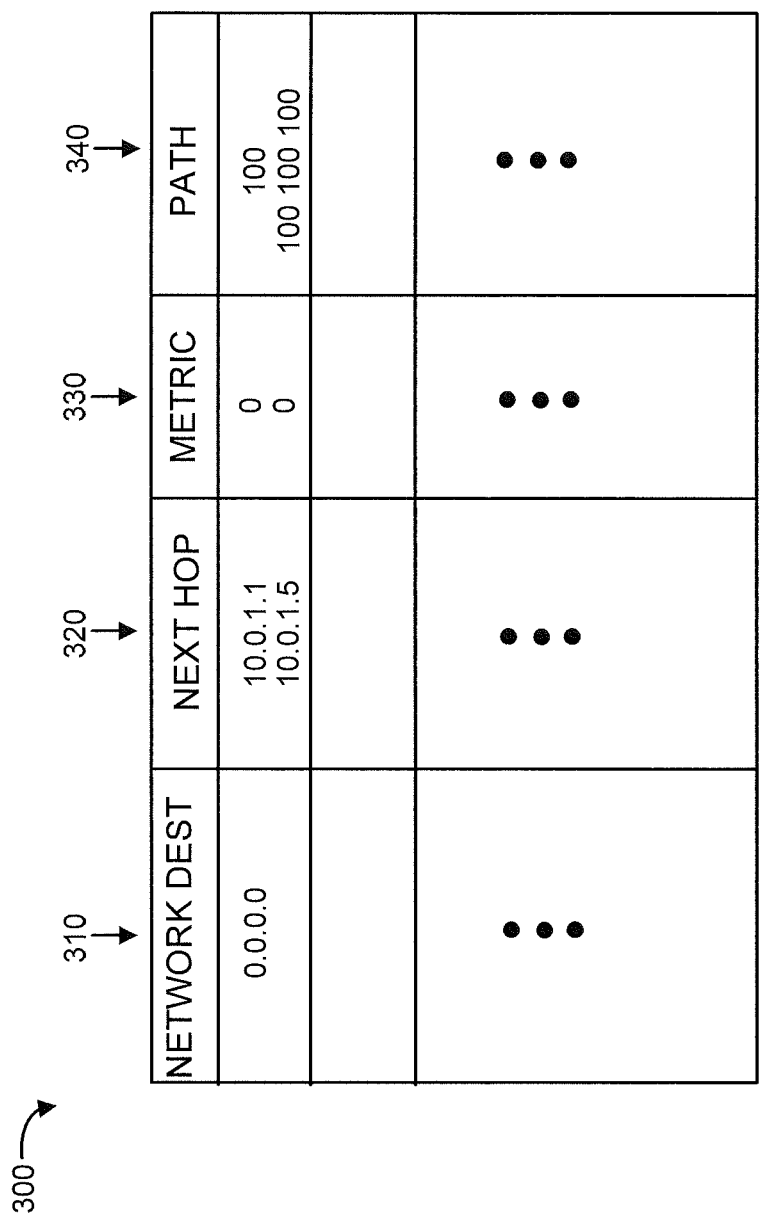
FIG. 3 is a diagram illustrating an example of a routing table.

FIG. 3 is a diagram illustrating an example of a routing table 300, such as a routing table maintained by one of satellite modem 134, satellite gateway routers 142/146, and/or a satellite hub server 146. Each row of routing table 300 may include a number of fields. Four fields are shown in example routing table 300: network destination field 310, next hop field 320, metric field 330, and path attribute field 340. Network destination field 310 may include an address or identifier for the destination of an incoming packet. The destination may be specified as, for example, an IPv4 (Internet Protocol, version 4) or IPv6 (Internet Protocol, version 6) address. For routing table 300, an example destination address of "0.0.0.0" is illustrated, which may correspond to a "default" route in routing table 300. A default route (the all zero route in routing table 300) may be a route entered in routing table 300 that indicates the next hop for a received packet when the actual destination of the packet does not match an entry in routing table 300.

Next hop field 320 may include an address or identifier of the next hop for a packet destined for the address in network destination field 310. In general, the destination of received packets, such as the destination IP address specified in a header of the packet, are used to lookup, based on network destination field 310, the next hop for the packet. For the example default network destination shown in FIG. 3 (0.0.0.0), two possible next hop addresses are shown, the IPv4 addresses 10.0.1.1 and 10.0.1.5. In this situation, the router may choose which of these two addresses will be used as the next hop for a packet matching the default network destination. The router may choose based on the values in metric field 330 and/or path attribute field 340.

Metric field 330 may include one or more values relating to the path through which the packet is to be sent. For example, higher values in metric field 330 may mean that the network "cost" to send a packet is higher and that lower values should therefore be preferred over higher values. Path attributes field 340 may include BGP path attribute information. In BGP, the path attribute information defines characteristics relating to routes in routing table 300. The characteristics of each route may be received from the "advertising" network device (i.e., the network device publishing the route). Under BGP, routing policies may be set based on the path attribute information. One BGP attribute is the "AS-PATH" attribute. The AS-PATH attribute may include a path of all autonomous systems (e.g., networks) through which a route passes. A router advertising a route to a BGP peer may add its own autonomous system number to the AS-PATH attribute. In general, a BGP router, when making routing decisions in which multiple entries in routing table 300 match a destination address, may chose entries in routing table 300 that have a shorter AS-PATH length over longer AS-PATH length entries. In the example illustrated, two AS-PATH attributes, corresponding to the two next hop addresses, are illustrated. The first AS-PATH attribute has a shorter length (one entry) than the second AS-PATH attribute (length three). Accordingly, the router may choose next hop 10.0.1.1 over next hop 10.0.1.5. Next hop 10.0.1.5 may be used in a situation such as when next hop 10.0.1.1 is unreachable.

Consistent with aspects described herein, network devices in telecommunication system 100, such as satellite gateway routers 142 and 144, satellite hub servers 146, and satellite modem 134, which use BGP, may be configured to, among other things, limit the number of routes learned using BGP and filter the learned routes so that only routes from certain BGP peers are used. Limiting the number of routes learned can decrease the required size of the routing tables within the network devices.

Figure 4:
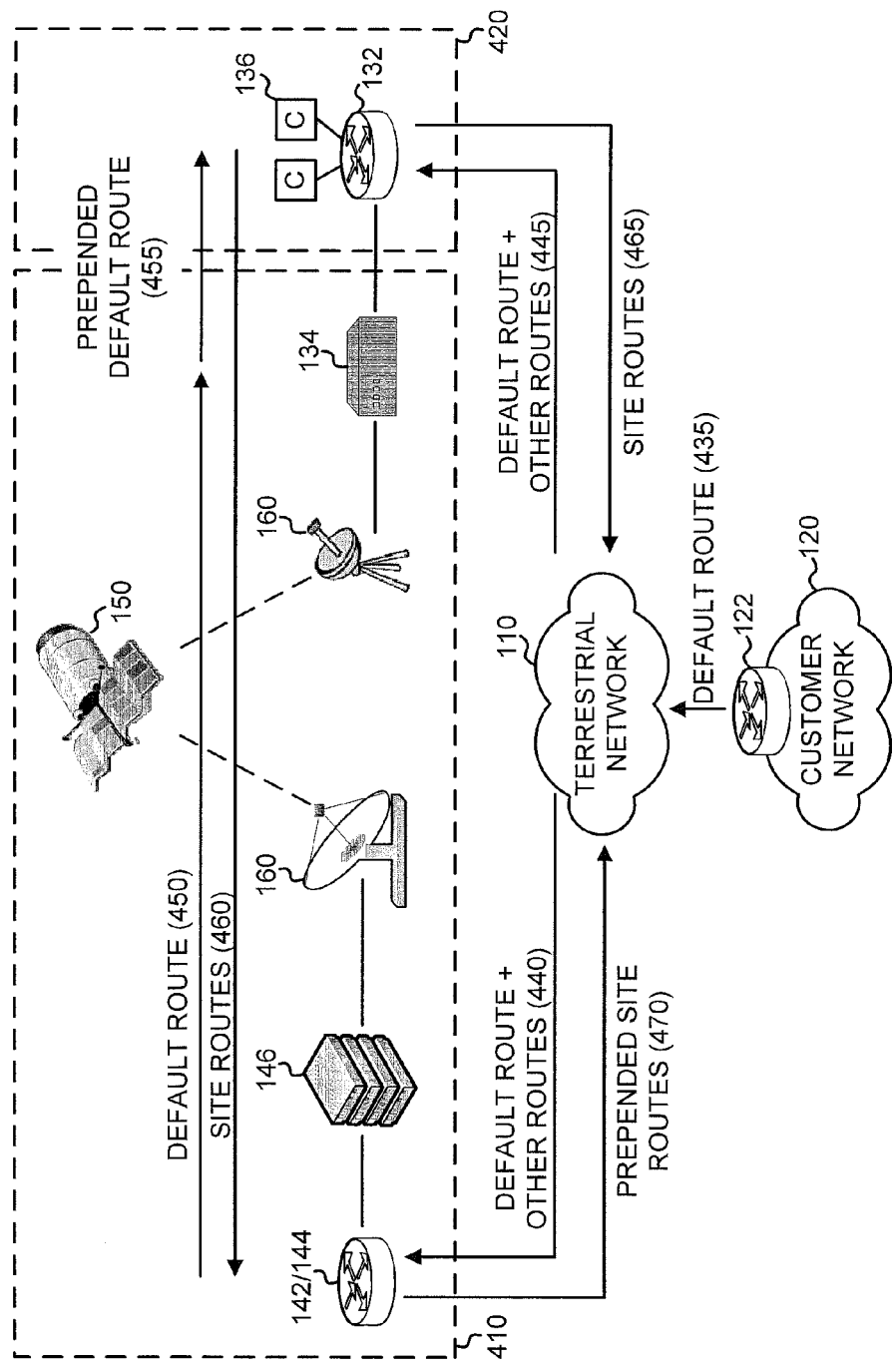
FIG. 4 is a diagram conceptually illustrating an example of limiting of routes learned for certain network devices in the telecommunication system shown in FIG. 1.

For example, higher values in metric field 330 may mean that the network "cost" to send a packet is higher and that lower values should therefore be preferred over higher values. FIG. 4 is a diagram conceptually illustrating an example of limiting of routes learned for certain network devices in telecommunication system 100. In FIG. 4, terrestrial network 110, customer network 120, customer edge router 122, edge router 132, satellite modem 134, satellite gateway routers 142 and 144, satellite network 150, and satellite receivers/transmitters 160 are implemented as was previously described with respect to FIG. 1. Communications made as part of BGP in setting up routing tables are particularly illustrated in FIG. 4.

In FIG. 4, the network elements may be grouped into autonomous systems, shown as autonomous system 410

(within a first dashed rectangle) and the network elements within rectangle 420 (edge router 132 and computing devices 136) may correspond to a second autonomous system. BGP running inside an autonomous system may be referred to as internal BGP (iBGP) and BGP running between autonomous systems may be referred to as external BGP (eBGP).

Customer network 120, such as customer edge router 122, may originate a default route that is to be used by satellite gateway routers 142/144 and edge router 132. In one implementation, satellite gateway routers 142/144 and/or edge router 132 may be configured, such as by an administrator, to recognize customer edge router 122 as corresponding to the default route. When satellite gateway routers 142/144 and/or edge router 132 receive a route, over BGP, in which a destination address corresponds to customer edge router 122, satellite gateway routers 142/144 and/or edge router 132 may enter this route in their routing tables as the default route. Routes not from customer edge router 122 may be ignored.

As shown in FIG. 4, customer edge router 122 may advertise, as part of BGP, the address of customer edge router 122 (communication 435—DEFAULT ROUTE). Network devices, such as other routers in terrestrial network 110, may also advertise themselves as part of BGP. Gateway routers 142/144 may receive, from terrestrial network 110 and as part of BGP, a number of routes (communications 440—DEFAULT ROUTE+OTHER ROUTES), including the default route corresponding to customer edge router 122 and the other routes from other networks and/or network devices. Similarly, customer edge router 132 may also receive, from terrestrial network 110 and as part of BGP, a number of routes (communications 445—DEFAULT ROUTE+OTHER ROUTES), including the default route corresponding to customer edge router 122 and the other routes from other networks and/or network devices.

The routes received by satellite gateway routers 142/144 from terrestrial network 110 (i.e., communications 440), may be entered into routing tables 300 of satellite gateway routers 142/144. Satellite gateway routers 142/144, however, may block the forwarding of all routes, except the default route, to satellite hub servers 146. Thus, only the default route may be advertised to satellite hub servers 146 (communication 450—DEFAULT ROUTE). In one implementation, satellite gateway routers 142/144 may use IP access control lists (ACLs) to block the non-default routes. ACLs include known techniques, supported by certain routers, in which masks can be used with IP addresses to specify what should be permitted and denied. Satellite gateway routers 142/144 may use ACLs to only permit the address corresponding to customer edge router 122 from being advertised as part of BGP. In alternative possible implementations, techniques other than using ACLs may be used to block the non-default routes.

Satellite hub servers 146, in response to receiving the default route (communication 440), may enter the default route in its routing table 300, and advertise, as part of BGP, the default route (communication 450) to satellite modem 134 (over satellite network 150). Satellite modem 134 may receive the default route (communication 450), enter the default route in its routing table, and advertise, as part of BGP, a version of the default route to edge router 132 in which the AS-PATH attribute is prepended to include autonomous system 410. For example, the default route may be prepended six times before the route is advertised to edge router 132 (communication 455—PREPENDED DEFAULT ROUTE). Because edge router 132 also receives the default route from terrestrial network 110 (i.e., communication 445—DEFAULT ROUTE+OTHER ROUTES), the routing table of edge router 132 may store two paths to customer network 120. Because of the AS-path prepending, however, the path through satellite network 150 may be a less preferred path. Accordingly, packets sent from computing devices 136 to edge router 132 will be preferably routed directly to customer network 120 over terrestrial network 110. If the direct path is down, however, the backup path over satellite network 150 may be used by edge router 132.

Network devices within customer premise 130, such as computing devices 136, may also advertise, using BGP, to edge router 132. Edge router 132 may advertise these routes (site routes) to both satellite modem 134 (communication 460—SITE ROUTES) and to terrestrial network 110 (communication 465—SITE ROUTES).

In one implementation, at satellite modem 134, an AS-path filter may be used to accept BGP routes from edge router 132 in which only the autonomous system number corresponding to autonomous system 420 is in the AS-path attribute. Additionally, in some implementations, satellite modem 134 may limit the total number of routes (e.g., a maximum number of five routes) that satellite modem 134 will forward over satellite network 150. Only accepting routes from autonomous server 420 and/or limiting the total number of advertised routes that are accepted from edge router 132 may ensure that too many routes are not flooded to satellite hub servers 146.

The site routes (communication 460) may be propagated through satellite hub servers 146 to satellite gateway routers 142/144, which may further advertise an AS-path prepended version of these routes to terrestrial network 110 (communication 470—PREPENDED SITE ROUTES). The AS-path prepending may be performed differently by satellite gateway router 142 than by satellite gateway router 144. For example, satellite gateway router 142 may prepend the AS number, corresponding to autonomous system 410, five times and satellite gateway router 144 may prepend the AS number, corresponding to autonomous system 410, six times. In this manner, the primary link between satellite hub 140 (through satellite gateway router 142) will be preferred and the backup link between satellite hub 140 (through satellite gateway router 144) will be used when the primary link is down.

In some implementations, in addition to limiting the total number of routes that satellite modem 134 will forward over satellite network 150, satellite hub server 146 may limit the maximum number of routes. For example, satellite hub servers 146 may each be configured to forward a maximum number of routes (e.g., two) over satellite network 150 and to satellite modem 134.

Figure 5A:
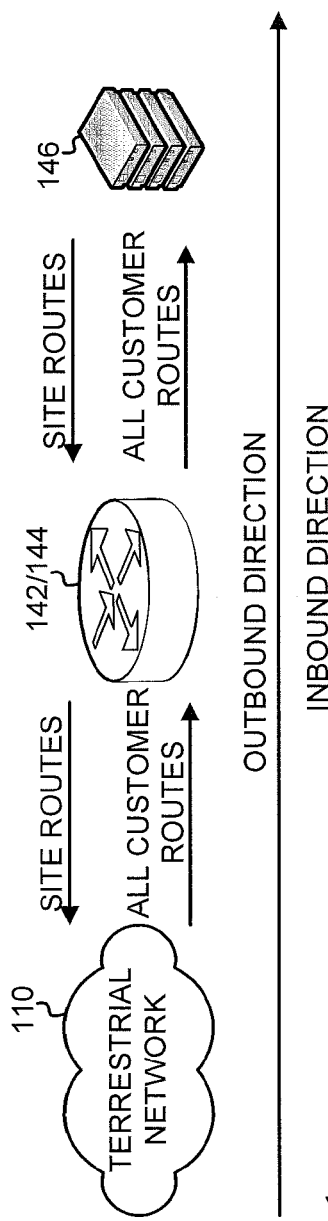
FIGS. 5A and 5B are diagrams illustrating differences between conventional BGP and route limited BGP.
Figure 5B:
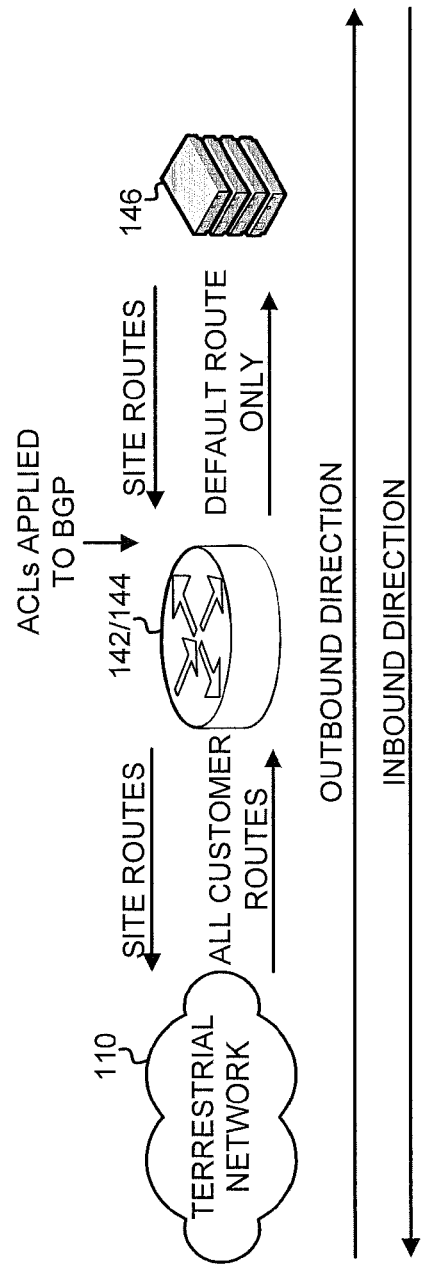

FIGS. 5A and 5B are diagrams illustrating differences between conventional BGP and the route limited "default" route BGP, as described above. In particular, FIG. 5A illustrates a portion of telecommunications system 100 using a standard "full" BGP and FIG. 5B illustrates a portion of telecommunications system 100 using route limited BGP.

Assume that terrestrial network 110 includes an IP network in which at least a portion of the network is dedicated to the entity (e.g., a company) that controls customer premises 130. For instance, MPLS may be used to create a PIP network, over a shared network, for a customer. As shown in FIG. 5A, with standard BGP, in the outbound direction (i.e., in the direction from terrestrial network 110 to satellite hub servers 146) all customer routes from terrestrial network 110 may be received and processed by satellite gateway routers 142/144 and by satellite hub servers 146. In the inbound direction (i.e., from satellite network 150 to satellite hub servers 146 and to terrestrial network 110), site routes from customer premise 130, transmitted over satellite network 150, may be received by satellite hub servers 146 and should be passed to satellite gateway routers 142/144.

As shown in FIG. 5B, consistent with aspects described herein, in the outbound direction all customer routes from terrestrial network 110 may be received and processed by satellite gateway routers 142/144. However, satellite gateway routers 142/144 may block all routes but the default route, corresponding to customer network 120. Satellite hub servers 146 may use default route instead of the dynamically learned routes when traffic is originated from the satellite network 150. Advantageously, satellite hub servers 146 may not be burdened with the additional routes, providing a more scalable architecture for satellite hub 140.

In FIG. 5B, in the inbound direction, site routes from customer premise 130, transmitted over satellite network 150, may be received and processed by satellite hub servers 146 and satellite gateway routers 142/144. In this manner, in the inbound direction, satellite hub 140 maintains the advantages of BGP in being able to dynamically learn routes, while using a "default" route to forward all outbound traffic to the desired location (customer network 120).

Figure 6:
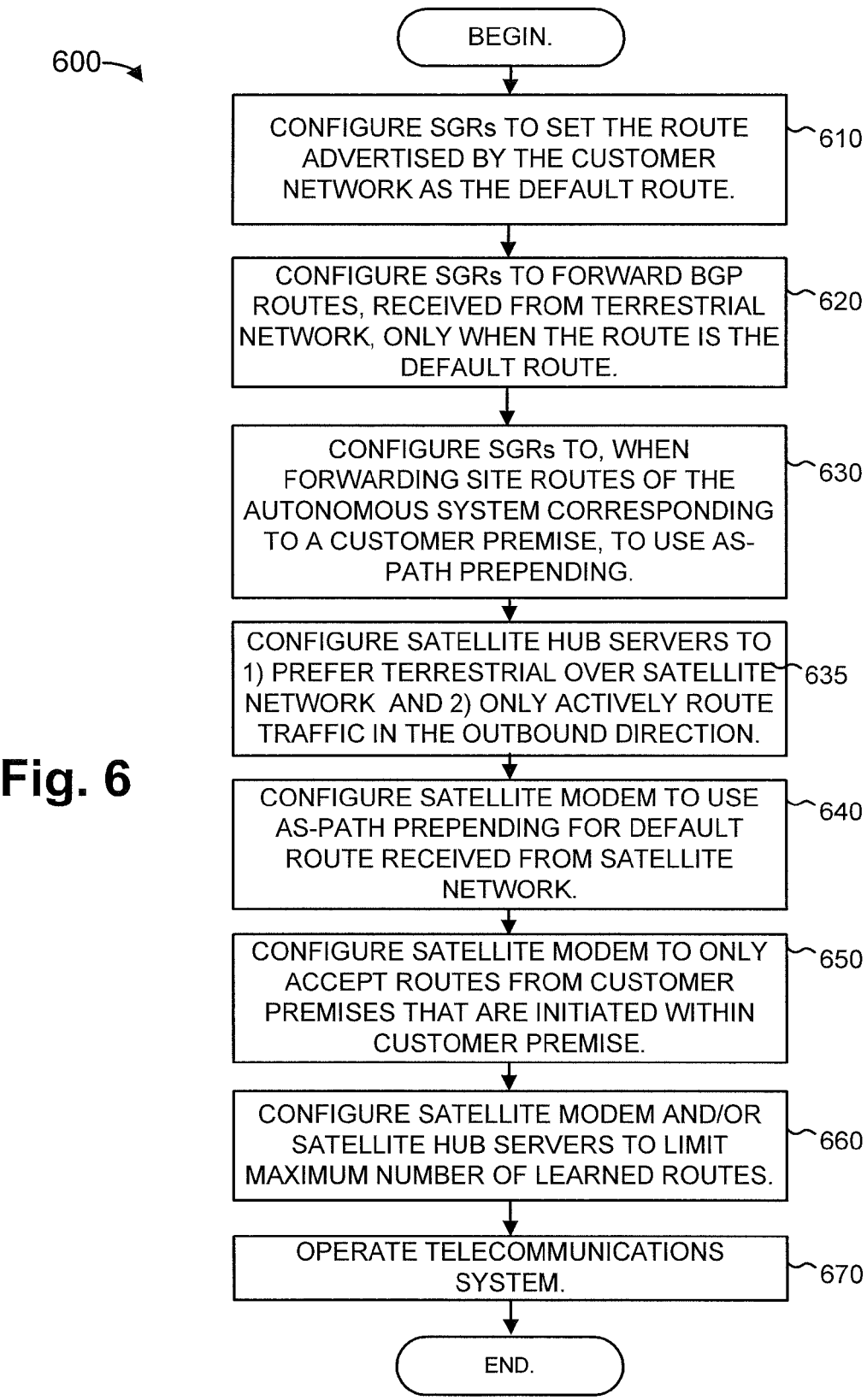
FIG. 6 is a flow chart illustrating an example process that may be performed in the system shown in FIG. 1.

FIG. 6 is a flow chart illustrating an example process 600 that may be performed in telecommunications system 100.

Process 600 may include configuring satellite gateway routers 142/144 to make the route advertised by customer network 120, such as the route advertised by customer edge router 122, as the default route (block 610). For example, an administrator may configure satellite gateway routers 142/144 to cause satellite gateway routers 142/144 to make the route advertised, via BGP, by customer edge router 122 to be set as the default route in routing tables 300 of satellite gateway routers 142/144. The administrator may, for example, setup a rule in satellite gateway routers 142/144 that specifies that route updates from the address of customer edge router 122 are to be entered as the default route.

Process 600 may further include configuring satellite gateway routers 142/144 to only forward routes received from terrestrial network 110 when a received route is the default route (block 620). In other words, routes from terrestrial network 110 that are not from customer edge router 122 may be blocked. In one implementation, ACLs may be used to block the non-default routes. By blocking routes (block 620) and by setting the route to customer network 110 as the default route (block 610), all traffic from customer premises 130, that is received at satellite hub 140, may be routed to customer network 110 without having to burden satellite hub servers 146 with routing paths for other network devices, such as other network devices in terrestrial network 110.

Process 600 may further include configuring satellite gateway routers 142/144 to, when forwarding site routes of the autonomous system corresponding to a customer premise, to use AS-path prepending (block 630). AS-path prepending may mark the site routes, from satellite hub 140, that are received by customer network 110, as lower priority than the site routes that are received by customer network 110 "directly" (i.e., without traversing satellite network 150) from an edge router 132. In one implementation, the prepending performed by satellite gateway router 142 may be different than the prepending performed by satellite gateway router 144 in order to designate a preferred and a backup status for satellite gateway routers 142/144.

Process 600 may further include configuring satellite hub servers 146 to prefer terrestrial routes leaned from satellite gateway routers 142/144 and pass routing decisions on inbound traffic to satellite gateway routers 142/144 (block 635).

Process 600 may further include configuring satellite modem 134 to perform AS-path prepending for the default route received from satellite network 150 (block 640). As shown in FIG. 4, the default route may be transmitted from satellite gateway routers 142/144, over satellite network 150, and to satellite modem 134. Satellite modem 134, when forwarding the default route to edge router 132, may prepend the default route. Accordingly, at edge router 132, the default route to customer network 120, as received directly over terrestrial network 110, will have a higher priority than the default route to customer network 120 that traverses satellite network 150.

Process 600 may further include configuring satellite modem 134 to only accept routes from customer premises 130 that are initiated within customer premises 130 (block 650). For example, if satellite modem 134 is connected to a customer premise with a certain autonomous system value (e.g., 1000), satellite modem 134 may be configured to only accept BGP routes in which the PATH attribute field includes only the value 1000. This configuration can advantageously provide control over the possibility of over burdening satellite modem 134.

Process 600 may further include configuring one or both of satellite modem 134 and/or satellite hub servers 146 to limit the number of routes that can be learned (block 660). For example, satellite modem 134 may be configured to limit the number of learned routes from edge router 132 to a maximum of five. Similarly, satellite hub servers 146 may be configured to limit the number of learned routes from satellite gateway routers 142/144 to a maximum of two. In some implementations, when satellite modem 134 and/or satellite hub servers 146 are configured to limit the number of learned routes to a maximum number and the maximum number is exceeded, satellite modem 134 and/or satellite hub servers 146 may simply drop the BGP peer. In other implementations, satellite modem 134 and/or satellite hub servers 146 may perform another action, such as drop the routing message (i.e., not learn the routing message).

Process 600 may further include operating telecommunications system 100 using the configurations made pursuant to blocks 610 through 660 (block 670). As described previously, operating telecommunications system 100 with the BGP route limiting configurations of blocks 610 through 660 may provide for lower resource requirements and better scalability of BGP routing devices that are part of a satellite hub.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While a series of blocks has been described in FIG. 6, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A system comprising:
one or more satellite hub servers to connect to a satellite network; and
a satellite gateway router connected to a terrestrial network and to the one or more satellite hub servers, the satellite gateway router to:
forward, to the one or more satellite hub servers, a route advertised pursuant to border gateway protocol (BGP) and received from the terrestrial network, the forwarding being performed when the route corresponds to a predetermined network;
block, when the route does not correspond to the predetermined network, the forwarding of the route to the one or more satellite hub servers, and
set, in a routing table of the satellite gateway router, the route as a default route of the satellite gateway router when the route corresponds to the predetermined network;
wherein the satellite hub servers actively route traffic in the outbound direction, from the terrestrial network to the satellite network, by making routing decisions on routes learned from the satellite gateway router and that affect a content of one or more routing tables contained in the satellite hub servers, and pass routes learned from the satellite network to the satellite gateway router, regardless of the content of the one or more routing tables contained in the satellite hub servers;
wherein the satellite hub servers pass routing decisions on inbound traffic, from the satellite network to the terrestrial network, to the satellite gateway router.

2. The system of claim 1, further comprising:
a second satellite gateway router connected to the terrestrial network, the second satellite gateway router functioning as a backup to the satellite gateway router.

3. The system of claim 1, where the one or more satellite hub servers are further to:
receive the forwarded route from the satellite gateway router; and
update the one or more routing tables contained in the one or more satellite hub servers in response to the forwarded route.

4. The system of claim 3, where, when updating the one or more routing tables, the one or more satellite hub servers are further to:
update the one or more routing tables so that a predetermined maximum number of routes, from the satellite gateway router, are in the routing table, where when the predetermined maximum number of routes is exceeded, a BGP peer is dropped or the forwarded route is dropped.

5. The system of claim 1, wherein the routes learned from the satellite network are site routes received via the BGP and advertised by customer premise networks connected to the one or more satellite hub servers via the satellite network.

6. The system of claim 5, where the satellite gateway router is further to:
prepend autonomous system (AS) path values to the received site routes to lower a routing priority of the site routes; and
advertise the prepended site routes to the terrestrial network.

7. The system of claim 5, further comprising:
satellite modems, each associated with a respective one of the customer premise networks, each satellite modem to advertise respective site routes.

8. The system of claim 7, where the satellite modems are further to:
receive the route, over the satellite network, from the one or more satellite hub servers;
prepend autonomous system (AS) path values to the received route; and
advertise the prepended route, to respective edge routers associated with the respective ones of the customer premise networks.

9. The system of claim 7, where the satellite modems are further to:
accept second routes received from the respective customer premise networks only when the second routes are initiated from within the respective ones of the customer premise networks.

10. The system of claim 5, where the customer premise networks and the predetermined network are coupled together using the satellite network as a backup connection.

11. A method, implemented by a satellite hub server and a satellite gateway router in a satellite hub that provides network connectivity between a satellite network and a terrestrial network, the method comprising:
setting, by the satellite gateway router, a first route, advertised using border gateway protocol (BGP) by the terrestrial network external to the satellite hub, to be a default route for the satellite gateway router;
blocking, by the satellite gateway router, forwarding of second routes, advertised using BGP, when the second routes do not correspond to the default route;
receiving, by the satellite gateway router, site routes from the satellite network;
prepending, by the satellite gateway router, autonomous system (AS) path values to the received site routes to lower the priority of the site routes; and
advertising, by the satellite gateway router, the prepended site routes to the terrestrial network;
wherein the satellite hub server actively routes traffic in an outbound direction, from the terrestrial network to the satellite network, by making routing decisions on routes learned from the satellite gateway router and that affect a content of one or more routing tables contained in the satellite hub server, and passes the site routes learned from the satellite network to the satellite gateway router, regardless of the content of the one or more routing tables contained in the satellite hub server;
wherein the satellite hub server passes routing decisions on inbound traffic, from the satellite network to the terrestrial network, to the satellite gateway router.

12. The method of claim 11, where the first route is a route that is predetermined to correspond to an autonomous system to which all traffic received over the satellite network is to be routed.

13. The method of claim 11, where the satellite gateway router provides edge routing for the satellite hub in connecting the satellite hub to the terrestrial network.

14. The method of claim 13, where a number of times the AS path values are prepended to the received site routes is based on whether the satellite gateway router provides backup or primary edge routing for the satellite hub.

15. The method of claim 11, further comprising:
storing the second routes in a routing table of the satellite gateway router.

16. A satellite gateway router comprising:
a routing table to store routes relating to routing of packets through a plurality of networks;
one or more processors; and
a memory to store programming instructions for execution by the one or more processors to:
set, a first route in the routing table, advertised using border gateway protocol (BGP) by a first predetermined network of the plurality of networks, to be a default route for the device;
block forwarding of second routes, advertised using BGP, when the second routes do not correspond to the default route;
receive site routes from satellite hub servers connected to the satellite gateway router and a satellite network, the site routes being transmitted over the satellite network from customer premise networks associated with the first predetermined network;
prepend autonomous system (AS) path values to the received site routes; and
advertise the prepended site routes using BGP;
wherein the satellite hub servers actively route traffic in an outbound direction, from a terrestrial network to the satellite network, by making routing decisions on routes learned from the satellite gateway router and that affect a content of one or more routing tables contained in the satellite hub servers, and pass the site routes learned from the satellite network to the satellite gateway router, regardless of the content of the one or more routing tables contained in the satellite hub servers;
wherein the satellite hub servers pass routing decisions on inbound traffic, from the satellite network to the terrestrial network, to the satellite gateway router.

17. The device of claim 16, where a number of times the AS path values are prepended to the received site routes is based on whether the satellite gateway router provides backup or primary edge routing for a satellite hub comprising the satellite gateway router and satellite hub servers.

18. The device of claim 16, where the first route is a route that is predetermined to correspond to an autonomous system to which all traffic received over the satellite network is to be routed.

19. The device of claim 16, where the memory further stores programming instructions to:
store the second routes in the routing table of the satellite gateway router.

* * * * *